United States Patent
Maruyama

(10) Patent No.: US 10,422,949 B2
(45) Date of Patent: *Sep. 24, 2019

(54) OPTICAL FIBER AND METHOD OF MANUFACTURING THE SAME

(71) Applicant: FUJIKURA LTD., Tokyo (JP)

(72) Inventor: Ryo Maruyama, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,186

(22) Filed: Jul. 17, 2018

(65) Prior Publication Data

US 2019/0049663 A1  Feb. 14, 2019

Related U.S. Application Data

(63) Continuation-in-part of application No. 15/877,697, filed on Jan. 23, 2018.

(Continued)

(51) Int. Cl.
*G02B 6/036* (2006.01)
*G02B 6/028* (2006.01)
*G02B 6/02* (2006.01)

(52) U.S. Cl.
CPC ......... *G02B 6/03644* (2013.01); *G02B 6/021* (2013.01); *G02B 6/02009* (2013.01);
(Continued)

(58) Field of Classification Search
CPC .......................... G02B 6/03627; G02B 6/0281
See application file for complete search history.

(56) References Cited

U.S. PATENT DOCUMENTS 8,135,255 B2  3/2012  Oyamada et al.
8,891,925 B2  11/2014  Bickham et al.
(Continued)

FOREIGN PATENT DOCUMENTS

EP      3185056 A1     6/2017
WO    2016/047749 A1   3/2016

OTHER PUBLICATIONS

International Telecommunication Union Telecommunication Standardization Sector (ITU-T), "Series G: Transmission Systems and Media, Digital Systems and Networks," G.657, dated Nov. 2016 (24 pages).

(Continued)

*Primary Examiner* — Omar R Rojas
(74) *Attorney, Agent, or Firm* — Osha Liang LLP

(57) ABSTRACT

An optical fiber includes a core, a depressed inner cladding surrounding the core, and an outer cladding surrounding the inner cladding, where a refractive index profile of the core includes an α power distribution in which an index α is 3.5 or more and 6 or less, a relative refractive index difference $\Delta^-$ of the inner cladding with respect to the adding is set such that an absolute value $|\Delta^-|$ thereof is 0.01% or more and 0.045% or less, a radius r1 of the core and an outer circumference radius r2 of the inner cladding are set such that a ratio r1/r2 thereof is 0.2 or more and 0.6 or less, a cable cutoff wavelength $\lambda_{cc}$ of 22 m is 1260 nm or less, and a mode field diameter MFD at a wavelength of 1310 nm is 8.6 μm or more and 9.5 μm or less.

10 Claims, 5 Drawing Sheets

Related U.S. Application Data

(60) Provisional application No. 62/533,671, filed on Jul. 18, 2017.

(52) U.S. Cl.
CPC ......... *G02B 6/0281* (2013.01); *G02B 6/0288* (2013.01); *G02B 6/02342* (2013.01); *G02B 6/03627* (2013.01); *G02B 6/02214* (2013.01)

(56) References Cited

U.S. PATENT DOCUMENTS 9,188,736 B2 * 11/2015 Mishra .................. G02B 6/02
9,772,444 B2    9/2017 Kitamura et al.

OTHER PUBLICATIONS

Izawa, T. et al., "Research and Development of Vapor-phase Axial Deposition method (VAD method)," [online], Japan Society for the Promotion of Science, National Institute of Informatics, accessed Jun. 26, 2017, http://dbnst.nii.ac.jp/pro/detail/511 (2 pages).

Kagata et al., 2, 3 NTT Technical Journal, p. 94-99, Sep. 2015 (6 pages).

Fujikura News, No. 408, Jul. 2015 (3 pages).

Okubo, Katsuhiko, "Optical Fiber Technology in the ISDN Era," pp. 2-10 to 2-20, Rikogakusha Publishing Co., Ltd., 1989 (10 pages).

Jeunhomme, L. B., "Single-Mode Fiber Optics: Principles and Applications, Second Edition, Revised and Expanded," Marcel Dekker, Inc., New York, p. 39-44, 1990 (14 pages).

International Telecommunication Union Telecommunication Standardization Sector (ITU-T), "Series G: Transmission Systems and Media, Digital Systems and Networks," G.650.1, dated Jul. 2010 (76 pages).

International Telecommunication Union Telecommunication Standardization Sector (ITU-T), "Series G: Transmission Systems and Media, Digital Systems and Networks," G.652, dated Nov. 2016 (28 pages).

International Telecommunication Union Telecommunication Standardization Sector (ITU-T), "Transmission Media Characteristics Definition and Test Methods for the Relevant Parameters of Single-Mode Fibres," G.650, dated Mar. 1993 (52 pages).

Office Action issued in related U.S. Appl. No. 15/877,697 dated May 11, 2018 (7 pages).

Office Action issued in related U.S. Appl. No. 15/877,697 dated Sep. 28, 2018 (8 pages).

Advisory Action issued in related U.S. Appl. No. 15/877,697, dated Jan. 18, 2019 (7 pages).

Office Action issued in related U.S. Appl. No. 15/877,69,7 dated Feb. 8, 2019 (7 pages).

C.D.Hussey et al.; "Theory of the profile-moments description of single-mode fibres"; IEE Proceedings, vol. 129, No. 3, pp. 123-134; Jun. 1982 (12 pages).

J.M. Senior; "Optical Fiber Communications Principles and Practice"; Third Edition, ch. 2, pp. 54-57; Pearson Education; 2009 (5 pages).

* cited by examiner

OPTICAL FIBER AND METHOD OF MANUFACTURING THE SAME

This application is a Continuation-in-Part Application of U.S. patent application Ser. No. 15/877,697, filed Jan. 23, 2018, which claims priority on U.S. Patent Application No. 62/533,671, provisionally filed Jul. 18, 2017, the contents of which are incorporated herein by reference.

BACKGROUND

Field of the Invention

The present invention relates to an optical fiber including a depressed inner cladding between a core and an outer cladding. Further, the present invention relates to a manufacturing method of manufacturing such an optical fiber.

PCT International Publication No. 2016/047749 pamphlet (published on Mar. 31, 2016; hereinafter referred to as Patent Document 1) discloses an optical fiber including a depressed inner cladding between a core and an outer cladding. Patent Document 1 describes that an optical fiber can be realized having a bending loss that satisfies the International Telecommunication Union Telecommunication Standardization Sector (ITU-T) Recommendation G.657.A1, which is an international standard for optical fibers, while maintaining a mode field diameter and limiting a connection loss with a general-purpose optical fiber to a small value, by optimizing a relative refractive index difference $\Delta^-$ of the inner cladding with respect to the outer cladding and optimizing a ratio r1/r2 of a radius r1 of the core to an outer circumference radius r2 of the inner cladding.

A mode field diameter (MFD) is represented by a definition formula (the following formula (1)) of Petermann II in the ITU-T Recommendation G.650.1. Here, E(r) indicates the electric field intensity at a point to which the distance from a central axis of the optical fiber is r.

$$MFD = 2w = 2\sqrt{\frac{2\int_0^\infty E^2(r)r\,dr}{\int_0^\infty [dE(r)/dr]^2 r\,dr}} \quad (1)$$

Further, the bending loss indicates an increase in loss when an optical fiber is wound around a mandrel or the like having a predetermined radius.

Incidentally, in an optical fiber, it is necessary to consider dispersion characteristics in addition to the connection loss and the bending loss. For example, in the ITU-T Recommendation G.652, it is recommended that a zero dispersion wavelength ZDW be 1300 nm or more and 1324 nm or less and that a zero dispersion slope be 0.073 ps/km/nm² or more and 0.092 ps/km/nm² or less. In consideration of manufacturing variation, it is preferable to design an optical fiber in which the zero dispersion wavelength is 1305 nm or more and 1319 nm or less.

However, an optical fiber including a depressed inner cladding tends to have a zero dispersion wavelength less than that of an optical fiber including no depressed inner cladding. In the optical fiber described in Patent Document 1, the zero dispersion wavelength may be less than 1305 nm. Therefore, in the optical fiber described in Patent Document 1, there remains room for improvement in the dispersion characteristics.

The zero dispersion wavelength denotes a wavelength at which the value of chromatic dispersion becomes zero. Here, the chromatic dispersion is the sum of material dispersion and waveguide dispersion. Further, the zero dispersion slope denotes a change rate of the chromatic dispersion with respect to a wavelength at the zero dispersion wavelength.

One or more embodiments of the present invention may improve dispersion characteristics while obtaining both of low connection loss and low bending loss in an optical fiber having a depressed inner cladding.

SUMMARY

A first aspect of one or more embodiments of the present invention is an optical fiber including a core, a depressed inner cladding surrounding the core, and an outer cladding surrounding the inner cladding, wherein a refractive index profile of the core includes an $\alpha$ power distribution in which an index $\alpha$ is 3.5 or more and 6 or less, a relative refractive index difference $\Delta^-$ of the inner cladding with respect to the adding is set such that an absolute value $|\Delta^-|$ thereof is 0.01% or more and 0.045% or less, a radius r1 of the core and an outer circumference radius r2 of the inner cladding are set such that a ratio r1/r2 thereof is 0.2 or more and 0.6 or less, a cable cutoff wavelength $\lambda_{cc}$ of 22 m is 1260 nm or less, and a mode field diameter MFD at a wavelength of 1310 nm is 8.6 µm or more and 9.5 µm or less.

A second aspect of one or more embodiments of the present invention is that in the optical fiber of the first aspect, the refractive index profile of the core includes an $\alpha$ power distribution in which an index $\alpha$ is 5 or more and 6 or less.

A third aspect of one or more embodiments of the present invention is that in the optical fiber of the first or second aspect, the relative refractive index difference $\Delta^-$ is set such that the absolute value $|\Delta^-|$ thereof is 0.01% or more and 0.03% or less.

A fourth aspect of one or more embodiments of the present invention is that in the optical fiber of one of the first to third aspects, the radius r1 and the outer circumference radius r2 are set such that the ratio r1/r2 thereof is 0.25 or more and 0.55 or less.

A fifth aspect of one or more embodiments of the present invention is that in the optical fiber of one of the first to fourth aspects, a relative refractive index difference $\Delta^+$ of the core with respect to the outer cladding is set to be 0.30% or more and 0.45% or less.

A sixth aspect of one or more embodiments of the present invention is that in the optical fiber of one of the first to fifth aspects, a zero dispersion wavelength ZDW is 1305 nm or more.

A seventh aspect of one or more embodiments of the present invention is that in the optical fiber of the sixth aspect, the zero dispersion wavelength ZDW is 1307 nm or more.

A eighth aspect of one or more embodiments of the present invention is that in the optical fiber of one of the first to seventh aspects, the mode field diameter MFD is 8.8 µm or more and 9.4 µm or less.

A ninth aspect of one or more embodiments of the present invention is that in the optical fiber of one of the first to eighth aspects, (1) an increase in loss at a wavelength of 1550 nm when the optical fiber is wound around a cylindrical mandrel having a radius of 10 mm is less than 0.75 dB/turn, (2) an increase in loss at a wavelength of 1625 nm when the optical fiber is wound around a cylindrical mandrel having a radius of 10 mm is less than 1.5 dB/turn, (3) an increase in loss at a wavelength of 1550 nm when the optical fiber is wound around a cylindrical mandrel having a radius of 15 mm is less than 0.25 dB/10 turn, and (4) an increase in loss at a wavelength of 1625 nm when the optical fiber is wound around a cylindrical mandrel having a radius of 15 mm is less than 1.0 dB/10 turn.

A tenth aspect of one or more embodiments of the present invention is a method of manufacturing the optical fiber of one of the first to ninth aspects, the method including the step of manufacturing a preform for the optical fiber through a vapor-phase axial deposition (VAD) method.

According to one or more embodiments of the present invention, it is possible to improve dispersion characteristics while obtaining both of low connection loss and low bending loss.

DETAILED DESCRIPTION (Structure of Optical Fiber)

Figure 1:
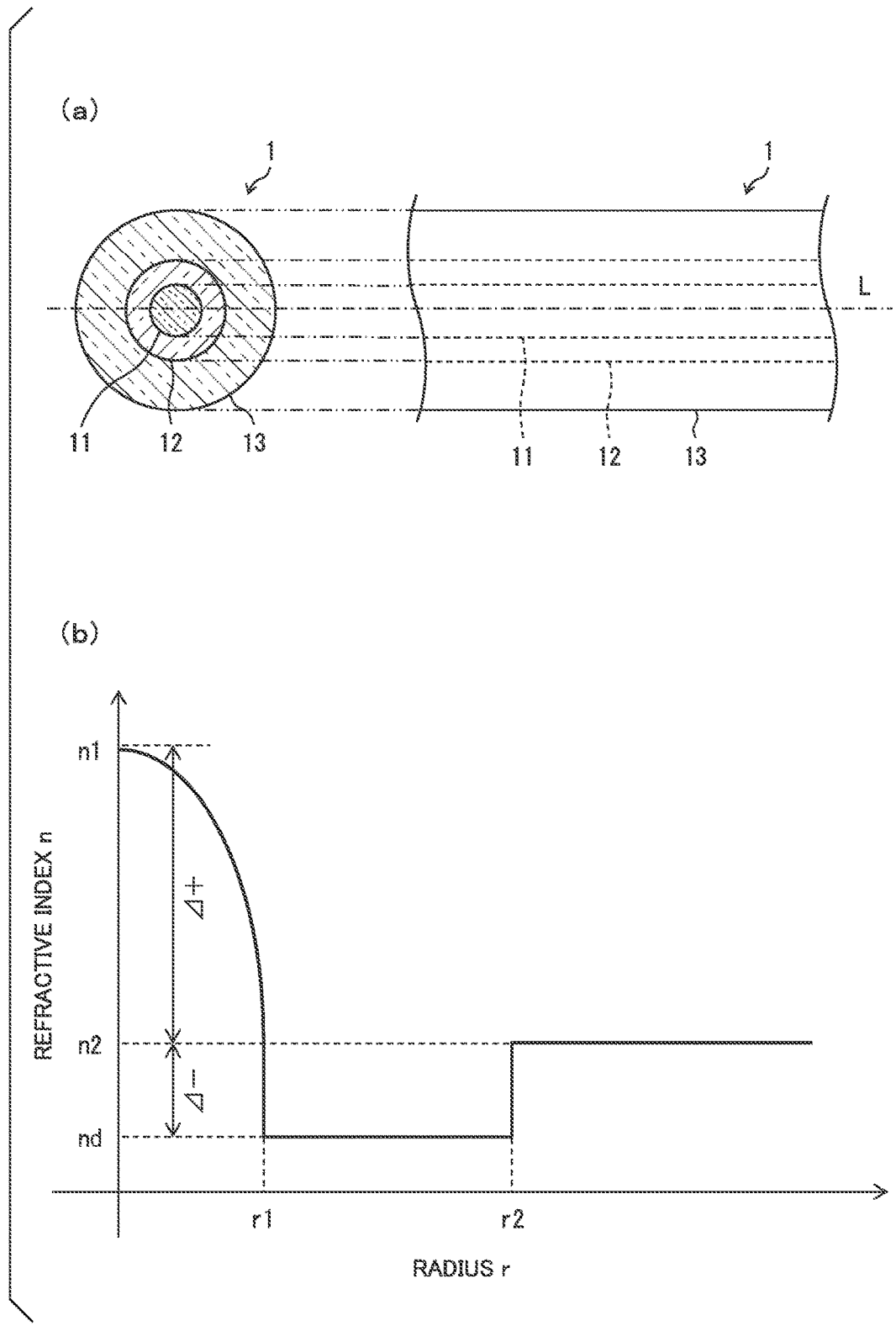
FIG. 1 is a view showing a structure of an optical fiber of one or more embodiments of the present invention. The portion (a) of FIG. 1 is a cross-sectional view (left side) and a side view (right side) showing the structure of the optical fiber, and the portion (b) of FIG. 1 is a graph showing a refractive index profile of the optical fiber.

A structure of an optical fiber 1 of one or more embodiments of the present invention is described with reference to FIG. 1. In FIG. 1, the portion (a) thereof is a cross-sectional view (left side) and a side view (right side) of the optical fiber 1, and the portion (b) thereof is a graph showing a refractive index profile of the optical fiber 1. A cross-sectional structure shown in the portion (a) of FIG. 1 is common to cross-sections of the optical fiber 1 orthogonal to a central axis L of the optical fiber 1.

The optical fiber 1 is a columnar structure containing silica glass as a main component, and as shown in the portion (a) of FIG. 1, includes a core 11 having a circular cross-section (having a radius r1), a depressed inner cladding 12 having an annular cross-section (having an inner circumference radius r1 and an outer circumference radius r2) surrounding the core 11, and an outer cladding 13 having an annular cross-section (having an inner circumference radius r2 and an outer circumference radius r3) surrounding the inner cladding 12. The core 11 is an area to which an up-dopant such as germanium is added and which has a refractive index higher than that of the outer cladding 13, and the inner cladding 12 is an area to which a down-dopant such as fluorine is added and which has a refractive index lower than that of the outer cladding 13.

As shown in the portion (b) of FIG. 1, the refractive index of the core 11 is approximated by an α power distribution. In other words, in the core 11, the refractive index n(r) at a point to which the distance from the central axis L is r is approximated by $n(r)=n1[1-2\Delta^+(r/r1)^\alpha]^{1/2}$. Here, n1 represents the refractive index on the central axis L, and $\Delta^+$ represents the relative refractive index difference of the core 11 with respect to the outer cladding 13. In addition, when α is increased, the α power distribution gradually approaches a step-type refractive index profile in which the refractive index is constant.

As shown in the portion (b) of FIG. 1, the refractive index of the inner cladding 12 is approximated by a uniform distribution. In other words, in the inner cladding 12, the refractive index n(r) at a point to which the distance from the central axis L is r is approximated by n(r)=nd (a constant). Further, as shown in the portion (b) of FIG. 1, the refractive index of the outer cladding 13 is approximated by a uniform distribution. In other words, in the outer cladding 13, the refractive index n(r) at a point to which the distance from the central axis L is r is approximated by n(r)=n2 (a constant). Among a maximum refractive index n1 of the core 11, the refractive index nd of the inner cladding 12, and the refractive index n2 of the outer cladding 13, the relationship of nd<n2<n1 is satisfied.

In the following description, a relative refractive index difference $\Delta^+$ of the core 11 with respect to the outer cladding 13 is used instead of the maximum refractive index n1 of the core 11. Here, the relative refractive index difference $\Delta^+$ is an amount defined by $\Delta^+=(n1^2-n2^2)/(2n1^2)\times 100$ [%]. Further, in the following description, a relative refractive index difference $\Delta^-$ of the inner cladding 12 with respect to the outer cladding 13 is used instead of the refractive index nd of the inner cladding 12. Here, the relative refractive index difference $\Delta^-$ is an amount defined by $\Delta^-=(nd^2-n2^2)/(2nd^2)\times 100$[%].

The refractive index profile of the optical fiber 1 is uniquely determined from the above-described constants α, $\Delta^+$, $\Delta^-$, r1, and r2. Hereinafter, the five constants are referred to as "structural parameters" of the optical fiber 1.

The actual refractive index profile n'(r) of the optical fiber 1 may not match the ideal refractive index profile n(r) shown in the portion (b) of FIG. 1. However, for the actual refractive index profile n'(r) of the optical fiber 1, the structural parameters α, $\Delta^+$, $\Delta^-$, r1, and r2 can also be defined according to the following procedure. The actual refractive index profile n'(r) of the optical fiber 1 is accurately approximated by the ideal refractive index profile n(r) that is determined from the structural parameters α, $\Delta^+$, $\Delta^-$, r1, and r2 defined according to the following procedure.

Step 1: In the actual refractive index profile n'(r) of the optical fiber 1, an average value in a range in which the refractive index of the outer cladding 13 is substantially constant is obtained, and the average value is set as the refractive index n2 of the outer cladding 13. For the calculation method of n2 of a substantially constant range, for example, the average value of n(r) with respect to r within a range from 5.5 times to 6.5 times of the value of r0 described later is used.

Step 2: An area of a core to be approximated by an α power distribution is determined. With regard to the actual refractive index profile n'(r), in the border between the core and the inner cladding, it may sometimes occur that n(r) gently changes with respect to r. For example, in this border, n(r) may gradually decrease as r increases. It is considered that this reason is that elements such as Ge or F doped in silica glass thermally diffuses in the manufacturing process of a preform using, for example, the VAD method. In such a refractive index profile, if the fitting is performed on an area including the border between the core and the inner cladding, the area may not be accurately approximated. On the other hand, if the fitting is performed on a core area except the border between the core and the inner cladding, the core area can be accurately approximated. Specifically, r obtaining the minimum value of a first derivative dn'(r)/dr of n'(r) with respect to r is determined and is set as r0. Next, an α power distribution, which best approximates (the square error is minimized) n'(r) in a range in which $0 \leq r \leq r0$, is obtained, and values of n1 and a are determined.

Even in a case where n(r) is intentionally set to gently change with respect to r in the border between the core and the inner cladding by forming a preform using the CVD method (Chemical Vapor Deposition method), the configuration of this embodiment including the above fitting method can be applied thereto.

With regard to r1, the minimum r obtaining n2 (namely, the average value in a range from $n(r0 \times 5.5)$ to $n(r0 \times 6.5)$) is determined and is set as r1. In a range in which $r0 < r < r1$, for example, the actual refractive index profile may be used, or it may be defined as n(r)=n2 in the range. In addition, the method of obtaining n2 includes, for example, a method of taking sampling points at predetermined intervals in $r0 \times 5.5 \leq r \leq 0 \times 6.5$ and of calculating the average value of n'(r) at each sampling point. In this case, although the predetermined interval is not particularly limited, it is, for example, 0.5 μm or a value less than 0.5 μm.

Step 3: In the actual refractive index profile n'(r) of the optical fiber 1, a minimum value $n_{min}$ of n'(r) is obtained, and an average value $n_{ave} = (n_{min} + n2)/2$ between the minimum value $n_{min}$ and the refractive index n2 is obtained. In the actual refractive index profile n'(r) of the optical fiber 1, a maximum r at which $n'(r) = n_{ave}$ is obtained, and this r is set as the outer circumference radius r2 of the inner cladding 12.

Step 4: The minimum r obtaining $n'(r) = n_{ave}$ is determined and is set as r4. In an area of $r4 < r < r2$, the average value of the actual refractive index profile n'(r) of the optical fiber 1 is obtained, and this average value is set as the refractive index nd of the inner cladding 12. The method of obtaining the average value includes, for example, a method of taking sampling points at predetermined intervals in $r4 < r < r2$ and calculating the average value of n'(r) at each sampling point. In this case, although the predetermined interval is not particularly limited, it is, for example, 0.5 μm or a value less than 0.5 μm.

Step 5: The relative refractive index difference $\Delta^+$ of the core 11 with respect to the outer cladding 13 is determined according to $\Delta^+ = (n1^2 - n2^2)/(2n1^2) \times 100[\%]$ from the refractive index n2 of the outer cladding 13 determined in step 1 and the maximum refractive index n1 of the core 11 determined in step 2. Further, the relative refractive index difference $\Delta^-$ of the inner cladding 12 with respect to the outer cladding 13 is determined according to $\Delta^- = (nd^2 - n2^2)/(2nd^2) \times 100[\%]$ from the refractive index n2 of the outer cladding 13 determined in step 1 and the refractive index nd of the inner cladding 12 determined in step 4.

Figure 2:
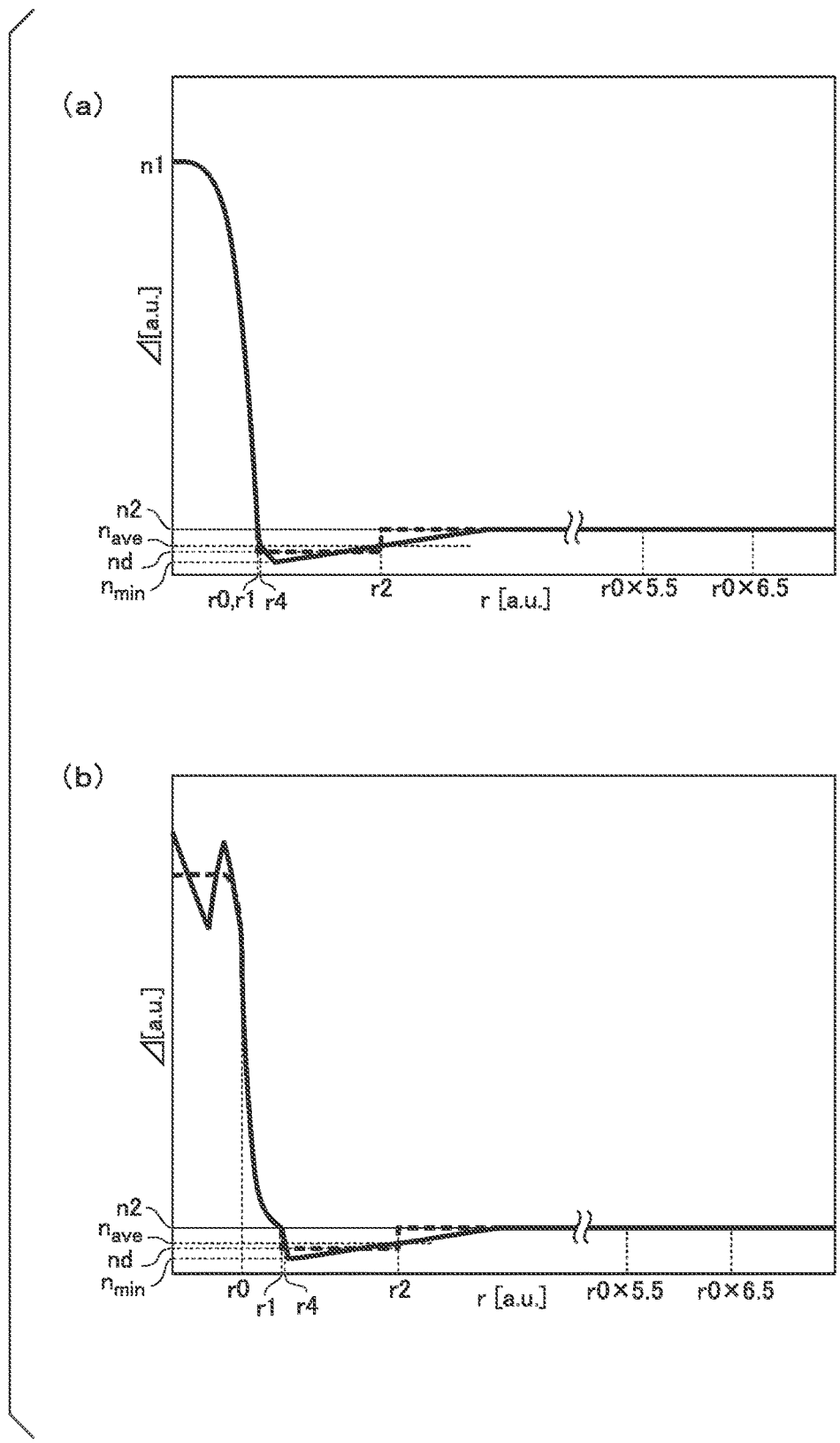
FIG. 2 is a graph showing a simulated actual refractive index profile and a graph showing an ideal refractive index profile determined according to definitions of one or more embodiments of the present invention.

A graph shown by a solid line in FIG. 2 indicates a simulated actual refractive index profile n'(r). The portion (a) of FIG. 2 shows a refractive index profile in a case where r0=r1, and the portion (b) of FIG. 2 shows a refractive index profile in a case where r0<r1. In each of these refractive index profiles, when the above-described procedure is applied to this refractive index profile n'(r), some structural parameters α, $\Delta^+$, $\Delta^-$, r1, and r2 are determined. When the ideal refractive index profile n(r) having the structural parameters α, $\Delta^+$, $\Delta^-$, r1, and r2 is plotted, a graph shown by a dotted line in FIG. 2 is obtained. According to FIG. 2, it can be confirmed that the actual refractive index profile n'(r) is accurately approximated by the ideal refractive index profile n(r) having the structural parameters α, $\Delta+$, $\Delta^-$, r1, and r2 determined according to the above procedure.

(Structural Parameters of Optical Fiber)

In the optical fiber 1 of this embodiment, it is possible that an index c of the refractive index profile of the core 11 satisfy the following condition (1).

$$3 \leq \alpha \leq 6 \tag{1}$$

When the index c is set to be too great, the zero dispersion wavelength ZDW may be less than a lower limit value (for example, 1305 nm) of the allowable range. When the index α is set to 6 or less, such a situation does not easily occur. On the other hand, when the index α is set to be too small, it is impossible or difficult to manufacture, through a vapor-phase axial deposition method (VAD method), the optical fiber 1 having a refractive index profile close to a design goal and a situation in which the zero dispersion wavelength ZDW exceeds an upper limit value (for example, 1319 nm) of the allowable range may occur. When the index α is set to 3 or more, such situations do not easily occur.

The VAD method is a method of manufacturing a preform, which has excellent mass productivity and economy. Further, the VAD method is known to have excellent characteristics such that (1) the process thereof is simple, (2) it is possible to continuously manufacture a preform, and (3) it is easy to manufacture a large-size preform (Reference 1: Tatsuo Izawa et. al., "Research and Development of Vapor-phase Axial Deposition method (VAD method)", [online], Japan Society for the Promotion of Science, National Institute of Informatics, [Accessed Jun. 26, 2017], Internet <URL: http://dbnst.nii.ac.jp/pro/detail/511]>). Therefore, about 60% of optical fibers for communication, which are produced worldwide, are produced through the VAD method (Reference 2: 2, 3 NTT Technical Journal, 2015. 9, Fujikura News, No. 408, 2015. 7). It is easy to manufacture a large-size preform through the VAD method because the VAD method is a manufacturing method of depositing soot in an axial direction of a preform. In contrast, it is difficult to manufacture a large-size preform through a Chemical Vapor Deposition method (CVD method) in which soot is deposited inside a hollow natural quartz tube in a radial direction.

However, in the VAD method, it is difficult to control the refractive index profile as compared with the CVD method. One cause of this is that, in the CVD method, soot is deposited and grown in the radial direction, whereas in the VAD method, soot is deposited and grown in the axial direction using one or two burners. However, when the shape and the position of a burner and the way in which a raw material and a fuel are supplied are optimized, it is possible to manufacture a preform that appropriately satisfies a specific refractive index profile (Reference 3: Katsuhiko Okubo, "Optical Fiber Technology in the ISDN Era", pp. 2-10 to 2-20, Rikogakusha Publishing Co., Ltd.). For example, in a case where the refractive index profile is an α power distribution, when the index α is 3 or more, it is possible to manufacture a preform that appropriately satisfies the refractive index profile.

In addition, the manufacturing method of this embodiment is not limited to the VAD method, and an optical fiber of this embodiment may be manufactured through another manufacturing method, for example, the CVD method.

In the optical fiber 1 of this embodiment, it is possible that the absolute value $|\Delta^-|$ of the relative refractive index difference $\Delta^-$ of the inner cladding 12 with respect to the outer cladding 13 satisfy the following condition (2), and it is further possible that the absolute value $|\Delta^-|$ satisfy the following condition (2').

$$0.01\% \leq |\Delta^-| \leq 0.045\% \tag{2}$$

$$0.01\% \leq |\Delta^-| \leq 0.03\% \tag{2'}$$

When the absolute value of the relative refractive index difference $\Delta^-$ becomes too small, a situation may occur in which the bending loss exceeds the upper limit value of the allowable range thereof. When the absolute value of the relative refractive index difference $\Delta^-$ is set to 0.01% or more, such a situation does not easily occur. On the other hand, when the absolute value of the relative refractive index difference $\Delta^-$ becomes too great, the mode field diameter decreases, and as a result, a situation may occur in which the connection loss in connection to another optical fiber exceeds the upper limit value of the allowable range thereof. When the absolute value of the relative refractive index difference $\Delta^-$ is set to 0.045% or less, the possibility of occurrence of such a situation is decreased, and when the absolute value of the relative refractive index difference $\Delta^-$ is set to 0.03% or less, the possibility of occurrence of such a situation is further decreased.

Further, in the optical fiber 1 of this embodiment, it is possible that the radius r1 of the core 11 and the outer circumference radius r2 of the inner cladding 12 be set such that a ratio r1/r2 satisfies the following condition (3), and it is further possible that the radius r1 and the outer circumference radius r2 be set such that the ratio r1/r2 satisfies the following condition (3').

$$0.2 \leq r1/r2 \leq 0.6 \tag{3}$$

$$0.25 \leq r1/r2 \leq 0.55 \tag{3'}$$

When the ratio r1/r2 becomes too small, the mode field diameter decreases, and as a result, a situation may occur in which the connection loss in connection to another optical fiber exceeds the upper limit value of the allowable range. When the ratio r1/r2 is set to 0.2 or more, the possibility of occurrence of such a situation is decreased, and when the ratio r1/r2 is set to 0.25 or more, the possibility of occurrence of such a situation is further decreased. On the other hand, when the ratio r1/r2 becomes too great, a situation may occur in which the bending loss exceeds the upper limit value of the allowable range. When the ratio r1/r2 is set to 0.6 or less, the possibility of occurrence of such a situation is decreased, and when the ratio r1/r2 is set to 0.55 or less, the possibility of occurrence of such a situation is further decreased.

It is possible that the structural parameters α, $\Delta^+$, $\Delta^-$, r1, and r2 be determined such that a cable cutoff wavelength $\lambda_{cc}$ of 22 m and the mode field diameters MFD at a wavelength of 1310 nm satisfy the following conditions (4) and (5), respectively, within a range specified by the above conditions (1), (2), and (3). Accordingly, it is possible to realize the optical fiber 1 that satisfies requirements specified in the ITU-T Recommendation G.652.

$$\lambda_{cc} \leq 1260 \text{ nm} \tag{4}$$

$$8.6 \text{ μm} \leq \text{MFD} \leq 9.5 \text{ μm} \tag{5}$$

The cutoff wavelength denotes a minimum wavelength at which a higher order mode (indicating an LP11 mode in this specification) is sufficiently attenuated. Specifically, the cutoff wavelength is a minimum wavelength at which a loss of a higher order mode becomes 19.3 dB. The cutoff wavelength includes a fiber cutoff wavelength and a cable cutoff wavelength and can be measured through, for example, a measurement method described in the ITU-T Recommendation G.650.

As described above, in the optical fiber 1 of this embodiment, the absolute value $|\Delta^-|$ of the relative refractive index difference $\Delta^-$ of the inner cladding 12 with respect to the outer cladding 13 is set to satisfy the above condition (2), and the radius r1 of the core 11 and the outer circumference radius r2 of the inner cladding 12 are set such that the ratio r1/r2 satisfies the above condition (3), whereby both low connection loss and low bending loss are obtained. Further, in the optical fiber 1 of this embodiment, dispersion characteristics are improved by setting the refractive index profile of the core to be an α power distribution in which the index α is 6 or less. Further, in the optical fiber 1 of this embodiment, it is possible to manufacture a preform through the VAD method by setting the refractive index profile of the core to be an α power distribution in which the index α is 3 or more.

Figure 3:
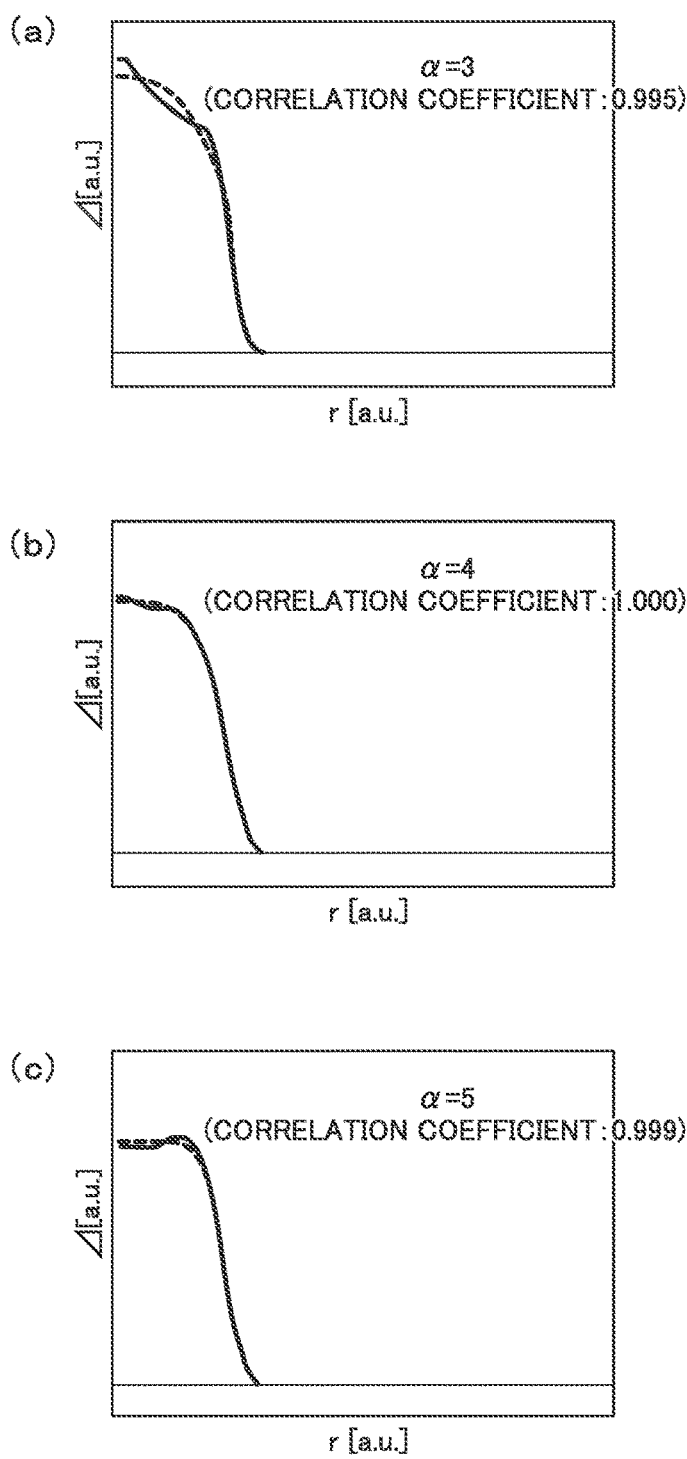
FIG. 3 is a graph showing a refractive index profile of an optical fiber (including no depressed inner cladding) manufactured through a VAD method with a design goal in which the refractive index profile of a core is an α power distribution and the refractive index profile of an outer cladding is a uniform distribution, together with the refractive index profile that is the design goal.

For reference, a graph is shown in FIG. 3 showing a refractive index profile of an optical fiber manufactured through the VAD method with a design goal in which the refractive index profile of the core includes an α power distribution and the refractive index profile of the outer cladding includes a uniform distribution, together with the refractive index profile that is the design goal. In FIG. 3, the portion (a) shows a refractive index profile in a case where the index α is approximately 3, the portion (b) shows a refractive index profile in a case where the index α is approximately 4, and the portion (c) shows a refractive index profile in a case where the index α is approximately 5. According to FIG. 3, it can be confirmed that in a case where the index α is 3 or more, an optical fiber having a refractive index profile close to the design goal can be manufactured through the VAD method.

Figure 4:
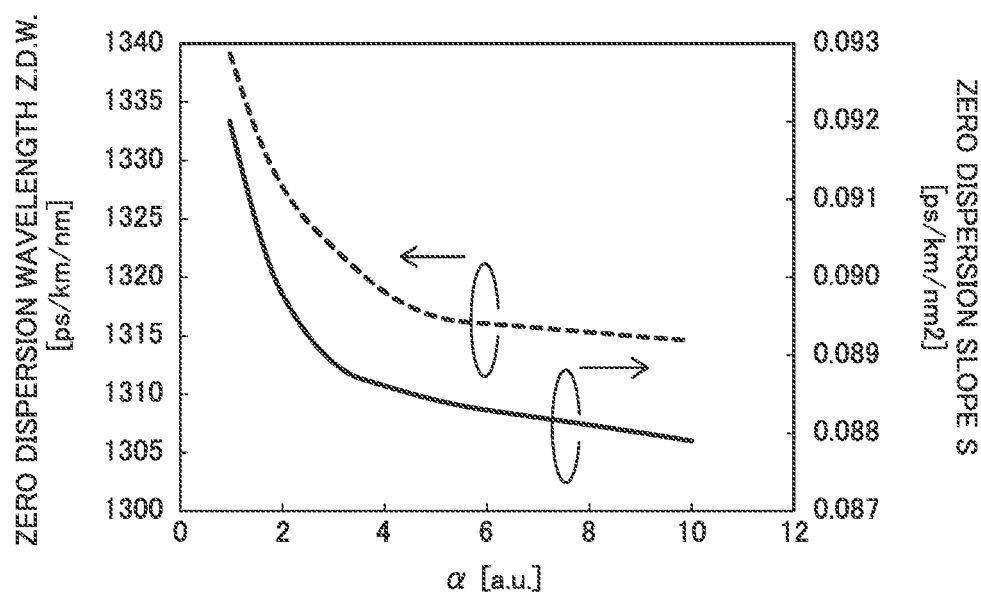
FIG. 4 is a graph showing a dependency of the zero dispersion wavelength ZDW and the zero dispersion slope of an optical fiber in which the refractive index profile of a core includes an α power distribution, the refractive index profile of an outer cladding includes a uniform distribution, and no depressed inner cladding is provided.
Figure 5:
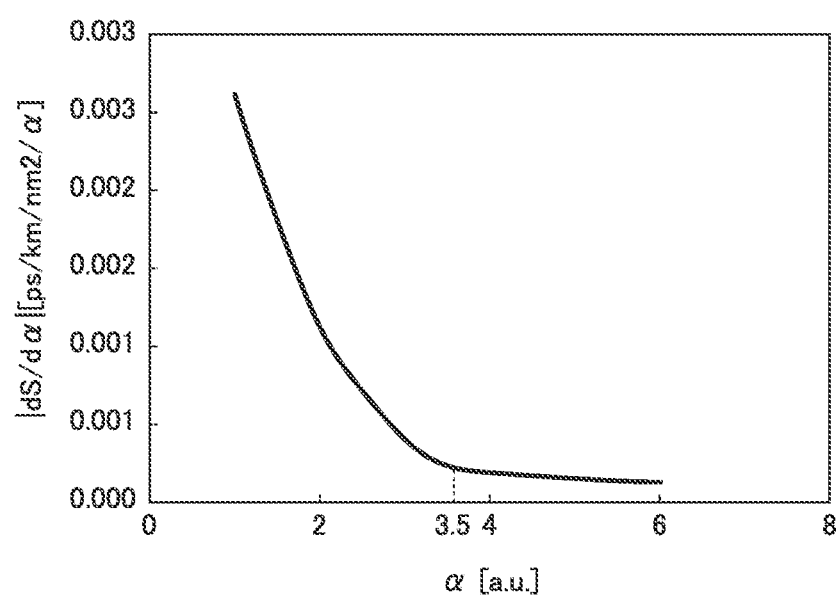
FIG. 5 is a graph showing a relationship between |dS/dα| and α, and |dS/dα| represents the absolute value of rate of change of the zero dispersion slope with respect to α.
Figure 6:
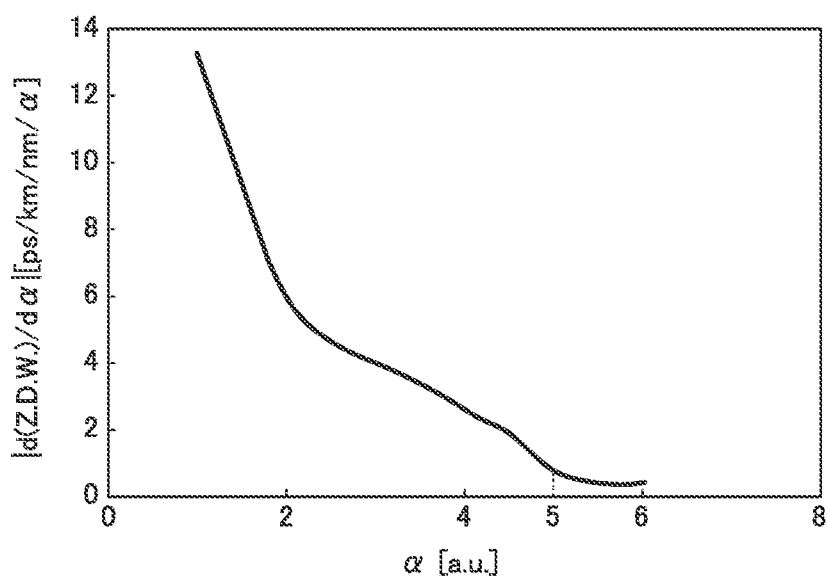
FIG. 6 is a graph showing a relationship between |d(ZDW)/dα| and α, and |d(ZDW)/dα| represents the absolute value of rate of change of the zero dispersion wavelength with respect to α.

In addition, for reference, a graph is shown in FIG. 4 indicating dependence of the zero dispersion wavelength ZDW and the zero dispersion slope on α when an MFD at a wavelength of 1.31 μm is 9.1 μm and a theoretical cutoff wavelength λct is 1.31 μm in an optical fiber (including no depressed inner cladding) in which the refractive index profile of the core is an α power distribution and the refractive index profile of the outer cladding is a uniform distribution. In FIG. 4, the graph shown by a dotted line represents a dependency of the zero dispersion wavelength ZDW, and the graph shown by a solid line represents a dependency of the zero dispersion slope. Here, the theoretical cutoff wavelength λct is a theoretical minimum wavelength that cannot be propagated in a target mode. A mathematical definition of the theoretical cutoff wavelength λct is described in Reference 4 (Single Mode Fiber Optics, Jeunhomme, pp. 39-44, Marcel Dekker, New York, 1990). It can be confirmed from FIG. 4 that the zero dispersion wavelength ZDW increases as the index α decreases. Further, it can be seen that the zero dispersion slope also exponentially increases as α decreases. If the central value of α is very small, the zero dispersion slope may steeply increase due to manufacturing variation, and the optical fiber may not satisfy the standards. FIG. 5 shows a relationship between $|dS/d\alpha|$ and a, and $|dS/d\alpha|$ represents the absolute value of rate of change of the zero dispersion slope with respect to a. According to FIG. 5, it can be seen that in an area close to α=2, $|dS/d\alpha|$ increases as a decreases. On the other hand, in an area in which α is comparatively large, $|dS/d\alpha|$ is small. In addition, when α is 3.5 or more, $|dS/d\alpha|$ converges. Therefore, it is possible that a is 3.5 or more in view of the controllability of the zero dispersion slope. By the same concept, there is a range of α in view of the zero dispersion wavelength. FIG. 6 shows a relationship between $|d(ZDW)/d\alpha|$ and a, and $|d(ZDW)/d\alpha|$ represents the absolute value of rate of change of the zero dispersion wavelength ZDW with respect to α. According to FIG. 6, $|d(ZDW)/d\alpha|$ decreases as α increases, and converges when α is 5 or more. Therefore, it is possible that a is 5 or more in view of the controllability of the zero dispersion wavelength.

Practical Example

Practical examples of the optical fiber 1 of this embodiment are described with reference to Tables 1 and 2. In Table 1, No. 1 indicates a comparative example in which α=6 and r1/r2>0.6, No. 2 indicates a comparative example in which α=4.8 and r1/r2<0.2, No. 3 indicates a comparative example in which α=4.8 and $|\Delta^-|<0.01\%$, No. 4 indicates a comparative example in which α=4.8 and $|\Delta^-|>0.045\%$, No. 5 indicates a comparative example in which α=6 and $|\Delta^-|>0.045\%$, Nos. 6 to 12 indicate comparative examples in which α<3, and Nos. 13 to 32 indicate practical examples in which 3≤α≤6. In Table 2, Nos. 33 to 58 indicate practical examples in which 3≤α≤6, and Nos. 59 to 67 indicate comparative examples in which α>6. In both of the practical examples and the comparative examples, the relative refractive index difference $\Delta^+$ is set to satisfy $0.30\% \leq \Delta^+ \leq 0.45\%$.

The MAC value shown in Tables 1 and 2 is a value obtained by dividing the mode field diameter MFD at a wavelength of 1310 nm by the cable cutoff wavelength $\lambda_{cc}$.

TABLE 1

| No. | α | Δ+ [%] | Δ− [%] | r1/r2 | r1 [μm] | r2 [μm] | MFD at 1.31 [μm] | CABLE CUTOFF WAVELENGTH λ cc [μm] | MAC | ZERO DISPERSION WAVELENGTH Z.D.W [μm] |
|---|---|---|---|---|---|---|---|---|---|---|
| 1 | 6.0 | 0.355 | −0.045 | 0.7 | 5.08 | 7.25 | 9.05 | 1.163 | 7.78 | 1.310 |
| 2 | 4.8 | 0.405 | −0.025 | 0.15 | 4.95 | 33.00 | 8.59 | 1.250 | 6.87 | 1.313 |
| 3 | 4.8 | 0.370 | −0.005 | 0.4 | 5.10 | 12.75 | 9.06 | 1.160 | 7.81 | 1.314 |
| 4 | 4.8 | 0.380 | −0.050 | 0.4 | 5.30 | 13.25 | 8.91 | 1.192 | 7.47 | 1.303 |
| 5 | 6.0 | 0.395 | −0.050 | 0.4 | 4.90 | 12.25 | 8.58 | 1.160 | 7.40 | 1.306 |
| 6 | 2.5 | 0.420 | −0.030 | 0.3 | 5.85 | 19.50 | 8.96 | 1.255 | 7.14 | 1.311 |
| 7 | 2.5 | 0.400 | −0.020 | 0.3 | 5.78 | 19.25 | 9.08 | 1.216 | 7.47 | 1.314 |
| 8 | 2.5 | 0.390 | −0.020 | 0.4 | 5.90 | 14.75 | 9.23 | 1.220 | 7.57 | 1.312 |
| 9 | 2.5 | 0.390 | −0.030 | 0.3 | 5.85 | 19.50 | 9.16 | 1.203 | 7.61 | 1.311 |
| 10 | 2.5 | 0.380 | −0.020 | 0.5 | 5.75 | 11.50 | 9.22 | 1.171 | 7.87 | 1.315 |
| 11 | 2.5 | 0.415 | −0.010 | 0.6 | 5.79 | 9.65 | 9.03 | 1.194 | 7.57 | 1.316 |
| 12 | 2.5 | 0.420 | −0.040 | 0.6 | 5.64 | 9.40 | 8.80 | 1.197 | 7.35 | 1.315 |
| 13 | 3.0 | 0.405 | −0.040 | 0.6 | 5.70 | 9.50 | 8.96 | 1.211 | 7.40 | 1.308 |
| 14 | 3.0 | 0.420 | −0.010 | 0.6 | 5.79 | 9.65 | 9.02 | 1.199 | 7.52 | 1.310 |
| 15 | 3.5 | 0.380 | −0.040 | 0.5 | 5.65 | 11.30 | 9.12 | 1.224 | 7.45 | 1.305 |
| 16 | 3.5 | 0.395 | −0.040 | 0.5 | 5.56 | 11.11 | 8.96 | 1.223 | 7.33 | 1.306 |
| 17 | 3.5 | 0.400 | −0.020 | 0.5 | 5.35 | 10.70 | 8.87 | 1.220 | 7.27 | 1.313 |
| 18 | 3.5 | 0.385 | −0.010 | 0.5 | 5.56 | 11.11 | 9.15 | 1.206 | 7.59 | 1.311 |
| 19 | 3.5 | 0.360 | −0.040 | 0.4 | 5.55 | 13.89 | 9.20 | 1.155 | 7.97 | 1.307 |
| 20 | 3.5 | 0.375 | −0.030 | 0.4 | 5.55 | 13.89 | 9.13 | 1.202 | 7.60 | 1.308 |
| 21 | 3.5 | 0.375 | −0.020 | 0.4 | 5.40 | 13.50 | 9.08 | 1.201 | 7.56 | 1.312 |
| 22 | 3.5 | 0.385 | −0.030 | 0.3 | 5.55 | 18.51 | 9.06 | 1.222 | 7.41 | 1.308 |
| 23 | 3.5 | 0.375 | −0.020 | 0.3 | 5.48 | 18.25 | 9.12 | 1.195 | 7.63 | 1.311 |
| 24 | 3.5 | 0.380 | −0.020 | 0.3 | 5.52 | 18.40 | 9.09 | 1.203 | 7.56 | 1.311 |
| 25 | 3.5 | 0.385 | −0.010 | 0.3 | 5.57 | 18.55 | 9.15 | 1.213 | 7.55 | 1.310 |
| 26 | 3.5 | 0.370 | −0.040 | 0.2 | 5.55 | 27.75 | 9.12 | 1.245 | 7.33 | 1.307 |
| 27 | 3.5 | 0.380 | −0.020 | 0.2 | 5.40 | 27.00 | 9.04 | 1.215 | 7.44 | 1.312 |
| 28 | 3.5 | 0.390 | −0.010 | 0.2 | 5.55 | 27.76 | 9.11 | 1.233 | 7.39 | 1.310 |
| 29 | 3.5 | 0.405 | −0.040 | 0.6 | 5.40 | 9.00 | 8.80 | 1.171 | 7.52 | 1.310 |
| 30 | 3.5 | 0.390 | −0.020 | 0.6 | 5.55 | 9.25 | 9.07 | 1.165 | 7.78 | 1.310 |
| 31 | 3.5 | 0.410 | −0.010 | 0.6 | 5.55 | 9.25 | 8.98 | 1.194 | 7.52 | 1.310 |
| 32 | 3.5 | 0.375 | −0.045 | 0.5 | 5.58 | 11.15 | 9.08 | 1.178 | 7.71 | 1.306 |

| No. | ZERO DISPERSION SLOPE S [ps/km/nm^2] | BENDING LOSS at 1.55 R = 10 mm [dB/turn] | BENDING LOSS at 1.55 R = 15 mm [dB/10 turn] | BENDING LOSS at 1.625 R = 10 mm [dB/turn] | BENDING LOSS at 1.625 R = 15 mm [dB/10 turn] |
|---|---|---|---|---|---|
| 1 | 0.085 | 0.81 | 0.04 | 1.55 | 0.22 |
| 2 | 0.086 | 0.21 | 0.01 | 0.66 | 0.12 |
| 3 | 0.087 | 0.92 | 0.03 | 1.60 | 0.19 |
| 4 | 0.089 | 0.26 | 0.02 | 0.81 | 0.15 |
| 5 | 0.087 | 0.25 | 0.02 | 0.80 | 0.15 |

TABLE 1-continued

|  | No. |  |  |  |  |  |
|---|---|---|---|---|---|---|
|  | 6 | 0.088 | 0.22 | 0.02 | 0.72 | 0.13 |
|  | 7 | 0.088 | 0.26 | 0.03 | 0.82 | 0.17 |
|  | 8 | 0.089 | 0.30 | 0.03 | 0.91 | 0.18 |
|  | 9 | 0.088 | 0.25 | 0.03 | 0.78 | 0.18 |
|  | 10 | 0.087 | 0.41 | 0.05 | 0.69 | 0.23 |
|  | 11 | 0.087 | 0.28 | 0.02 | 0.92 | 0.15 |
|  | 12 | 0.087 | 0.29 | 0.02 | 0.92 | 0.16 |
|  | 13 | 0.088 | 0.25 | 0.02 | 0.84 | 0.14 |
|  | 14 | 0.088 | 0.20 | 0.02 | 0.65 | 0.13 |
|  | 15 | 0.091 | 0.27 | 0.02 | 0.85 | 0.16 |
|  | 16 | 0.089 | 0.26 | 0.02 | 0.81 | 0.14 |
|  | 17 | 0.087 | 0.27 | 0.02 | 0.85 | 0.15 |
|  | 18 | 0.088 | 0.29 | 0.02 | 0.89 | 0.16 |
|  | 19 | 0.089 | 0.33 | 0.05 | 0.99 | 0.23 |
|  | 20 | 0.088 | 0.28 | 0.03 | 0.87 | 0.18 |
|  | 21 | 0.087 | 0.31 | 0.04 | 0.96 | 0.21 |
|  | 22 | 0.089 | 0.24 | 0.02 | 0.75 | 0.15 |
|  | 23 | 0.088 | 0.28 | 0.03 | 0.85 | 0.19 |
|  | 24 | 0.087 | 0.27 | 0.03 | 0.82 | 0.17 |
|  | 25 | 0.088 | 0.27 | 0.02 | 0.84 | 0.15 |
|  | 26 | 0.088 | 0.21 | 0.03 | 0.67 | 0.17 |
|  | 27 | 0.087 | 0.24 | 0.03 | 0.74 | 0.18 |
|  | 28 | 0.088 | 0.25 | 0.02 | 0.78 | 0.14 |
|  | 29 | 0.087 | 0.26 | 0.02 | 0.63 | 0.25 |
|  | 30 | 0.087 | 0.29 | 0.02 | 0.91 | 0.15 |
|  | 31 | 0.088 | 0.30 | 0.02 | 0.94 | 0.15 |
|  | 32 | 0.087 | 0.30 | 0.03 | 0.92 | 0.18 |

TABLE 2

| No. | α | ⊿+ [%] | ⊿− [%] | r1/r2 | r1 [μm] | r2 [μm] | MFD at 1.31 [μm] | CABLE CUTOFF WAVELENGTH λ cc [μm] | MAC | ZERO DISPERSION WAVELENGTH Z.D.W [μm] |
|---|---|---|---|---|---|---|---|---|---|---|
| 33 | 4.8 | 0.365 | −0.040 | 0.5 | 5.31 | 10.63 | 9.06 | 1.181 | 7.67 | 1.305 |
| 34 | 4.8 | 0.380 | −0.015 | 0.45 | 4.95 | 11.00 | 8.98 | 1.226 | 7.32 | 1.310 |
| 35 | 4.8 | 0.385 | −0.040 | 0.4 | 5.25 | 13.13 | 8.88 | 1.202 | 7.39 | 1.305 |
| 36 | 4.8 | 0.360 | −0.040 | 0.4 | 5.30 | 13.25 | 9.08 | 1.181 | 7.69 | 1.305 |
| 37 | 4.8 | 0.370 | −0.030 | 0.4 | 5.20 | 13.00 | 8.99 | 1.196 | 7.52 | 1.308 |
| 38 | 4.8 | 0.370 | −0.020 | 0.4 | 5.30 | 13.25 | 9.11 | 1.222 | 7.45 | 1.307 |
| 39 | 4.8 | 0.380 | −0.030 | 0.3 | 5.22 | 17.40 | 8.96 | 1.202 | 7.45 | 1.307 |
| 40 | 4.8 | 0.377 | −0.020 | 0.3 | 5.28 | 17.60 | 9.05 | 1.226 | 7.38 | 1.307 |
| 41 | 4.8 | 0.371 | −0.015 | 0.3 | 5.21 | 17.35 | 9.06 | 1.214 | 7.46 | 1.310 |
| 42 | 4.8 | 0.363 | −0.015 | 0.3 | 5.37 | 17.90 | 9.24 | 1.234 | 7.49 | 1.307 |
| 43 | 4.8 | 0.340 | −0.015 | 0.3 | 5.33 | 17.75 | 9.39 | 1.182 | 7.94 | 1.309 |
| 44 | 4.8 | 0.369 | −0.040 | 0.2 | 5.10 | 25.50 | 8.88 | 1.196 | 7.42 | 1.308 |
| 45 | 4.8 | 0.375 | −0.020 | 0.2 | 5.30 | 26.50 | 9.07 | 1.254 | 7.23 | 1.307 |
| 46 | 4.8 | 0.375 | −0.020 | 0.2 | 5.20 | 26.00 | 9.01 | 1.244 | 7.24 | 1.308 |
| 47 | 4.8 | 0.380 | −0.040 | 0.6 | 5.22 | 8.70 | 8.91 | 1.154 | 7.72 | 1.307 |
| 48 | 4.8 | 0.375 | −0.020 | 0.6 | 5.28 | 8.80 | 9.07 | 1.177 | 7.71 | 1.308 |
| 49 | 4.8 | 0.395 | −0.010 | 0.6 | 5.34 | 8.90 | 9.02 | 1.245 | 7.25 | 1.309 |
| 50 | 6.0 | 0.370 | −0.020 | 0.3 | 5.09 | 16.95 | 9.01 | 1.218 | 7.40 | 1.307 |
| 51 | 6.0 | 0.365 | −0.020 | 0.4 | 5.00 | 12.50 | 8.99 | 1.183 | 7.60 | 1.310 |
| 52 | 6.0 | 0.385 | −0.030 | 0.4 | 5.00 | 12.50 | 8.80 | 1.193 | 7.38 | 1.307 |
| 53 | 6.0 | 0.373 | −0.010 | 0.4 | 5.06 | 12.65 | 9.03 | 1.190 | 7.59 | 1.309 |
| 54 | 6.0 | 0.376 | −0.020 | 0.2 | 5.00 | 25.00 | 8.91 | 1.219 | 7.31 | 1.309 |
| 55 | 6.0 | 0.355 | −0.020 | 0.3 | 5.25 | 17.50 | 9.24 | 1.220 | 7.57 | 1.305 |
| 56 | 6.0 | 0.340 | −0.020 | 0.3 | 5.25 | 17.50 | 9.36 | 1.190 | 7.87 | 1.306 |
| 57 | 6.0 | 0.370 | −0.010 | 0.6 | 5.25 | 8.75 | 9.19 | 1.222 | 7.52 | 1.306 |
| 58 | 6.0 | 0.390 | −0.040 | 0.6 | 5.16 | 8.60 | 8.86 | 1.216 | 7.28 | 1.305 |
| 59 | 10.0 | 0.355 | −0.020 | 0.3 | 4.95 | 16.50 | 9.14 | 1.220 | 7.49 | 1.304 |
| 60 | 10.0 | 0.340 | −0.010 | 0.2 | 5.00 | 25.00 | 9.36 | 1.243 | 7.53 | 1.304 |
| 61 | 10.0 | 0.345 | −0.030 | 0.4 | 5.00 | 12.50 | 9.19 | 1.191 | 7.72 | 1.302 |
| 62 | 10.0 | 0.365 | −0.020 | 0.4 | 4.70 | 11.75 | 8.88 | 1.188 | 7.47 | 1.310 |
| 63 | 10.0 | 0.380 | −0.020 | 0.3 | 4.80 | 16.00 | 8.85 | 1.245 | 7.11 | 1.306 |
| 64 | 10.0 | 0.335 | −0.020 | 0.3 | 4.95 | 16.50 | 9.33 | 1.193 | 7.82 | 1.304 |
| 65 | 10.0 | 0.335 | −0.020 | 0.3 | 4.88 | 16.25 | 9.23 | 1.173 | 7.87 | 1.307 |
| 66 | 10.0 | 0.355 | −0.010 | 0.6 | 4.80 | 8.00 | 9.10 | 1.220 | 7.46 | 1.310 |
| 67 | 10.0 | 0.360 | −0.020 | 0.6 | 4.95 | 8.25 | 9.12 | 1.194 | 7.64 | 1.304 |

TABLE 2-continued

| No. | ZERO DISPERSION SLOPE S [ps/km/nm^2] | BENDING LOSS at 1.55 | | BENDING LOSS at 1.625 | |
|---|---|---|---|---|---|
| | | R = 10 mm [dB/turn] | R = 15 mm [dB/10 turn] | R = 10 mm [dB/turn] | R = 15 mm [dB/10 turn] |
| 33 | 0.089 | 0.29 | 0.03 | 0.91 | 0.19 |
| 34 | 0.088 | 0.28 | 0.03 | 0.89 | 0.16 |
| 35 | 0.088 | 0.25 | 0.02 | 0.78 | 0.15 |
| 36 | 0.088 | 0.29 | 0.04 | 0.88 | 0.21 |
| 37 | 0.087 | 0.28 | 0.03 | 0.88 | 0.19 |
| 38 | 0.087 | 0.28 | 0.03 | 0.88 | 0.17 |
| 39 | 0.088 | 0.24 | 0.02 | 0.76 | 0.15 |
| 40 | 0.088 | 0.26 | 0.02 | 0.79 | 0.15 |
| 41 | 0.087 | 0.28 | 0.03 | 0.87 | 0.18 |
| 42 | 0.088 | 0.28 | 0.03 | 0.87 | 0.17 |
| 43 | 0.086 | 0.44 | 0.05 | 1.27 | 0.23 |
| 44 | 0.087 | 0.21 | 0.03 | 0.68 | 0.19 |
| 45 | 0.087 | 0.23 | 0.02 | 0.72 | 0.15 |
| 46 | 0.087 | 0.28 | 0.03 | 0.88 | 0.18 |
| 47 | 0.087 | 0.31 | 0.03 | 0.95 | 0.16 |
| 48 | 0.087 | 0.32 | 0.03 | 0.99 | 0.16 |
| 49 | 0.088 | 0.21 | 0.02 | 0.69 | 0.13 |
| 50 | 0.087 | 0.26 | 0.03 | 0.82 | 0.16 |
| 51 | 0.087 | 0.30 | 0.03 | 0.93 | 0.20 |
| 52 | 0.087 | 0.26 | 0.02 | 0.80 | 0.15 |
| 53 | 0.088 | 0.29 | 0.03 | 0.89 | 0.16 |
| 54 | 0.087 | 0.23 | 0.02 | 0.73 | 0.15 |
| 55 | 0.088 | 0.28 | 0.03 | 0.85 | 0.18 |
| 56 | 0.088 | 0.33 | 0.05 | 0.98 | 0.22 |
| 57 | 0.086 | 0.30 | 0.02 | 0.95 | 0.15 |
| 58 | 0.087 | 0.22 | 0.02 | 0.74 | 0.14 |
| 59 | 0.088 | 0.27 | 0.03 | 0.85 | 0.17 |
| 60 | 0.088 | 0.29 | 0.04 | 0.88 | 0.20 |
| 61 | 0.089 | 0.30 | 0.04 | 0.92 | 0.20 |
| 62 | 0.086 | 0.30 | 0.03 | 0.93 | 0.19 |
| 63 | 0.087 | 0.25 | 0.02 | 0.79 | 0.14 |
| 64 | 0.089 | 0.43 | 0.05 | 0.69 | 0.23 |
| 65 | 0.088 | 0.42 | 0.05 | 1.23 | 0.23 |
| 66 | 0.086 | 0.38 | 0.03 | 1.16 | 0.19 |
| 67 | 0.086 | 0.32 | 0.03 | 0.99 | 0.24 |

The structural parameters α, Δ⁺, Δ⁻, r1, and r2 defined according to the above-described procedure, and characteristic values are shown in Tables 1 and 2.

According to Tables 1 and 2, it can be understood that the following characteristics (a) to (d) are obtained in all of the practical examples. In contrast, according to Table 1, in the comparative examples Nos. 1 and 3, since an increase in loss at a wavelength of 1550 nm when the optical fiber is wound around a cylindrical mandrel having a radius of 10 mm is greater than 0.75 dB/turn, and an increase in loss at a wavelength of 1625 nm when the optical fiber is wound around a cylindrical mandrel having a radius of 10 mm is greater than 1.5 dB/turn, required characteristics are not satisfied. In the comparative example Nos. 2 and 5, since the mode field diameter MFD at a wavelength of 1310 nm is less than 8.6 μm, required characteristics are not satisfied. In the comparative example No. 4, since the zero dispersion wavelength ZDW is less than 1305 nm, required characteristics are not satisfied. Since α=2.5 in the comparative examples Nos. 6 to 12, it is impossible or difficult to manufacture an optical fiber through the VAD method. Further, according to Table 2, in the comparative examples Nos. 59, 60, 61, 64 and 67, since the zero dispersion wavelength ZDW is less than 1305 nm, required characteristics are not satisfied.

(a) The zero dispersion wavelength ZDW is 1305 nm or more and 1313 nm or less, and satisfies a requirement (1300 nm or more and 1324 nm or less) specified in the ITU-TG.652 with a margin of 5 nm with respect to the lower limit value and with a margin of 11 nm with respect to the upper limit value.

(b) The cable cutoff wavelength $\lambda_{cc}$ is 1254 nm or less, and satisfies a requirement (1260 nm or less) specified in the ITU-T Recommendation G.652 with a margin of 6 nm.

(c) The mode field diameter MFD at a wavelength of 1310 nm is 8.8 μm or more and 9.4 μm or less, and satisfies a requirement (8.6 μm or more and 9.5 μm or less) specified in the ITU-T Recommendation G.652 with a margin of 2 μm with respect to the lower limit value and with a margin of 1 μm with respect to the upper limit value.

(d) The bending loss satisfies the following requirements specified in the ITU-T Recommendation G.657.A1.
   An increase in loss at a wavelength of 1550 nm when the optical fiber is wound around a cylindrical mandrel having a radius of 10 mm is less than 0.75 dB/turn.
   An increase in loss at a wavelength of 1625 nm when the optical fiber is wound around a cylindrical mandrel having a radius of 10 mm is less than 1.5 dB/turn.
   An increase in loss at a wavelength of 1550 nm when the optical fiber is wound around a cylindrical mandrel having a radius of 15 mm is less than 0.25 dB/10 turn.
   An increase in loss at a wavelength of 1625 nm when the optical fiber is wound around a cylindrical mandrel having a radius of 15 mm is less than 1.0 dB/10 turn.

In addition, according to Table 1, it is understood that some practical examples have the following characteristic (a') instead of the above characteristic (a).

(a') The zero dispersion wavelength ZDW is 1307 nm or more, and satisfies the requirement specified in the ITU-TG.652 with a margin of 7 nm with respect to the lower limit value.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical fiber, comprising:
   a core;
   a depressed inner cladding surrounding the core; and
   an outer cladding surrounding the inner cladding, wherein:
   a refractive index profile of the core comprises an α power distribution in which an index α is 3.5 or more and 6 or less,
   a relative refractive index difference $\Delta^-$ of the inner cladding with respect to the outer cladding is set such that an absolute value $|\Delta^-|$ thereof is 0.01% or more and 0.045% or less,
   a radius r1 of the core and an outer circumference radius r2 of the inner cladding are set such that a ratio r1/r2 thereof is 0.3 or more and 0.6 or less,
   a cable cutoff wavelength $\lambda_{cc}$ of 22 m is 1260 nm or less, and
   a mode field diameter MFD at a wavelength of 1310 nm is 8.6 μm or more and 9.5 μm or less.

2. The optical fiber according to claim 1, wherein the refractive index profile of the core comprises an α power distribution in which an index α is 5 or more and 6 or less.

3. The optical fiber according to claim 1, wherein the relative refractive index difference $\Delta^-$ is set such that the absolute value $|\Delta^-|$ thereof is 0.01% or more and 0.03% or less.

4. The optical fiber according to claim 1, wherein the radius r1 and the outer circumference radius r2 are set such that the ratio r1/r2 thereof is 0.25 or more and 0.55 or less.

5. The optical fiber according to claim 1, wherein a relative refractive index difference $\Delta^+$ of the core with respect to the outer cladding is set to be 0.30% or more and 0.45% or less.

6. The optical fiber according to claim 1, wherein a zero dispersion wavelength ZDW is 1305 nm or more.

7. The optical fiber according to claim 5, wherein the zero dispersion wavelength ZDW is 1307 nm or more.

8. The optical fiber according to claim 1, wherein the mode field diameter MFD is 8.8 μm or more and 9.4 μm or less.

9. The optical fiber according to claim 1, wherein (1) an increase in loss at a wavelength of 1550 nm when the optical fiber is wound around a cylindrical mandrel having a radius of 10 mm is less than 0.75 dB/turn, (2) an increase in loss at a wavelength of 1625 nm when the optical fiber is wound around a cylindrical mandrel having a radius of 10 mm is less than 1.5 dB/turn, (3) an increase in loss at a wavelength of 1550 nm when the optical fiber is wound around a cylindrical mandrel having a radius of 15 mm is less than 0.25 dB/10 turn, and (4) an increase in loss at a wavelength of 1625 nm when the optical fiber is wound around a cylindrical mandrel having a radius of 15 mm is less than 1.0 dB/10 turn.

10. A method of manufacturing the optical fiber according to claim 1, the method comprising the step of:
    manufacturing a preform for the optical fiber through a vapor-phase axial deposition (VAD) method.

* * * * *